United States Patent [19]

Kühl

[11] 3,904,157

[45] Sept. 9, 1975

[54] ARRANGEMENT FOR MEASURING THE DISTANCE BETWEEN TWO SUCCESSIVE OBJECTS

[75] Inventor: Burkhart Kühl, Ottobrunn, Germany

[73] Assignee: Messerschmitt-Bölkow-Blohm G.m.b.H., Munich, Germany

[22] Filed: Feb. 27, 1974

[21] Appl. No.: 446,269

[30] Foreign Application Priority Data
Mar. 7, 1973  Germany............................ 2311150

[52] U.S. Cl. .......................... 246/63 C; 246/167 D
[51] Int. Cl.² ........................................ B61L 25/00
[58] Field of Search.......... 246/122, 167 D, 8, 63 R, 246/63 C; 104/152; 179/82; 343/711, 712, 713; 336/117, 118, 119, 130

[56] References Cited
UNITED STATES PATENTS
3,836,770  9/1974  Helmcke........................ 246/167 D Primary Examiner—M. Henson Wood, Jr.
Assistant Examiner—Reinhard J. Eisenzopf
Attorney, Agent, or Firm—Woodhams, Blanchard and Flynn

[57] ABSTRACT

Means for eliminating interference between objects spaced along an electric line and arranged for measuring the distance between certain ones thereof. An apparatus involving spaced objects arranged in a row, as on a track, wherein each object has a transmitting device for injecting signals into a damped line, and has also a receiver for receiving a signal created and induced in said line from a transmitter of an object ahead. The attenuation of said signal is proportional to the distance between said objects and thus a measure of said distance. Furthermore each object is provided with a complex impedance coupled to said line between the receiver and the transmitter of the object. Such complex impedance effects a reflection point in said line between the receiver and the transmitter of the object and causes the signal of said transmitter flowing in the line in the direction of said receiver to be substantially smaller in amplitude than the signal flowing from the point of said transmitter in the direction of the next following object.

3 Claims, 2 Drawing Figures

PATENTED SEP 9 1975    3,904,157
Fig. 1
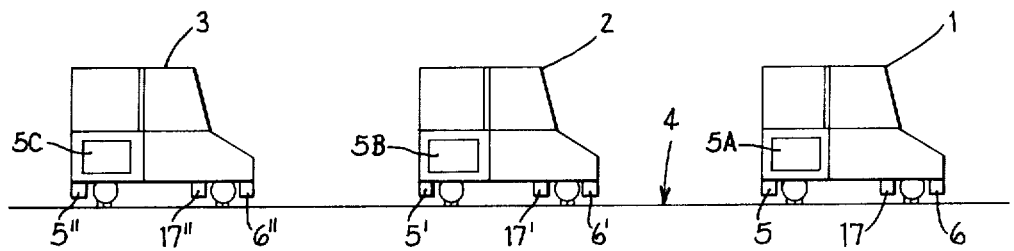
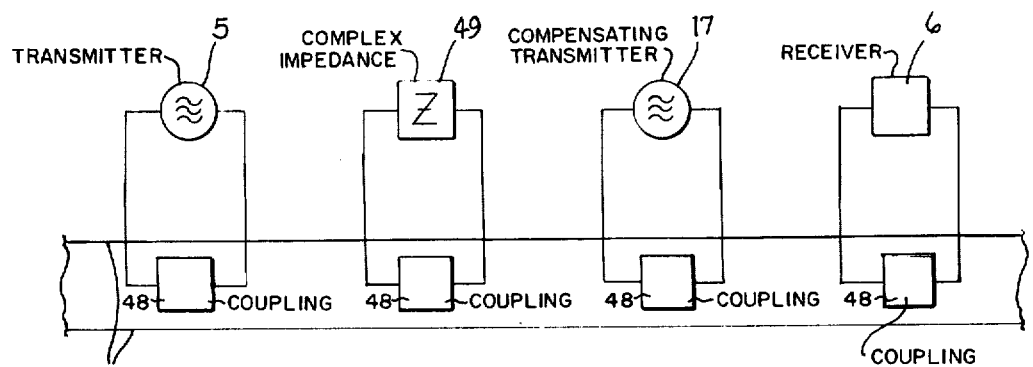
Fig. 2

ARRANGEMENT FOR MEASURING THE DISTANCE BETWEEN TWO SUCCESSIVE OBJECTS

FIELD OF THE INVENTION

The invention relates to an arrangement for measuring the distance between two successive track-carried objects which are equipped with transmitters and receivers wherein an electrical signal of a defined magnitude is sent out by a transmitter of the leading object and is received by a receiver in the next following object, which receiver has a defined sensitivity, and wherein the transmitter and receiver are coupled through a damped medium with defined attenuation. The present invention is a further development of that disclosed and claimed in Ser. No. 277,783, by Conrad Helmcke, Walter Hermann and Peter Kraus, filed Aug. 3, 1972, and assigned to Messerschmitt-Bolkow-Blohm GmbH of Munich, Germany now U.S. Pat. No. 3,836,770, issued Sept. 17, 1974.

BACKGROUND OF THE INVENTION

In the arrangement previously disclosed, the damped medium is a (specially) damped, homogeneous electric line (which extends along the path of travel of the objects), one form of which is disclosed in detail in U.S. Ser. No. 277,781 now U.S. Pat. No. 3,809,803, issued May 7, 1974 and assigned to the same assignee as the present application. Such lines consists of at least two conductors which are parallel with respect to one another and are conductingly connected between each other over their entire length through a conductive foil. The conductivity of this cross connection between the conductors is substantially less than the conductivity of the conductors. This results in a strong ohmic cross leakage of the line, which cross leakage in connection with the series impedance of the line results in such a strong damping of the line that the amplitude of a signal (high frequency voltage), which signal is coupled into the line from a transmitter, decreases measurably in a short line section (for example of one meter length) according to an exponential law with a negative exponent. The amplitude of the signal at any desired point of the line is thus a measurement for the distance between said point and the transmitter which couples the signal into the line. Thus it is possible by means of this line to inform an object, independent from certain reference points of its path of travel continuously of its distance from a preceding object, if its transmitter continuously sends out a signal of a defined amplitude or couples it into the line and the receiver of the following (receiving) object has a defined sensitivity.

In the aforedescribed measuring arrangement, and as described in more detail in said U.S. Pat. No. 3,836,770, a signal which is coupled from the transmitter of the preceding object into the line will spread symmetrically in said line, both in the direction of the following object (backwardly) and in the opposite direction (forwardly) and thereby, circumstances permitting, influence a signal which is transmitted to the receiver of the preceding object as from a transmitter of a still further object provided still further in front of such preceding object. In order to prevent this, a further development of the apparatus provides that at each object between its transmitter and receiver there is coupled a compensating transmitter with the line. A signal which is coupled by said compensating transmitter into the line will at least almost cancel at a suitable amplitude and phase relationship the signal which is coupled into the line by the measuring transmitter of the same object at the location of the compensating transmitter, without excessively effecting the spreading of this signal (of the measuring transmitter) backwardly. However, it is still possible that the amplitude of the signal, which results from both signals (from each of the measuring and the compensating transmitter), which signal thus spreads from the location of the measuring transmitter backwardly in the line may be reduced with respect to the amplitude of the signal which is coupled into the line by the measuring transmitter. This results in a reduction of the range of transmission of the measuring transmitter. This in any case is true for those cases in which the small distance from the measuring transmitter to the compensating transmitter, (which small distance is caused by the length of the object), and a weakly damped line with a correspondingly weak phase rotation per meter of line length results in a phase angle, which differs substantially from zero degree, between the signal of the measuring transmitter and the signal of the compensating transmitter at the location of the measuring transmitter.

The purpose of the invention is therefore to provide an arrangement of the above-mentioned type (in which the medium comprises an electrically conductive line) positioned within each object which will cause the spreading of its signal in direction of the receiver of the same object to be at least substantially suppressed without materially reducing the range of transmission of its transmitter.

SUMMARY OF THE INVENTION

This purpose is attained according to the invention by providing in each object, between the coupling of the transmitter with the line and the coupling of the receiver with the line, a complex impedance which is coupled with the line.

The complex impedance may be a network of passive structural elements (capacitive, inductive, or ohmic resistor elements) or for example a so-called gyrator (consisting of active structural elements). The coupling of the complex impedance, with the line can be done in an inductive or in a capacitive manner, preferably in the manner which has already been suggested for the transmitters and receivers of the objects.

The basic thought of the inventive arrangement is that the line which has been described above has an electric infinite length. In such a line the input impedance is equal to the characteristic impedance. The respective line section between transmitter and complex impedance represents, however, (because of same) an electrically short line which transforms its terminal impedance into the input impedance. If the amount of the input impedance of this electrically short line is made small (in the limiting case at zero) which is done by suitably selecting its length (or the distance between the coupling of the transmitter and the coupling of the complex impedance with the line) and by suitably dimensioning the complex impedance, then the signal of the transmitter, which signal spreads in direction of the receiver of the same object (forwardly) in the line, will be at least substantially smaller in amplitude than (starting from the location of the transmitter) the signal which spreads backwardly in the line (in the direction of the receiver of a following object). In a limiting case, the amplitude of the forwardly spreading signal can be zero.

The coupling of the complex impedance with the line will be provided advantageously near the one of the transmitter so that on dimensioning of the complex impedance, the damping of the respective line section between both coupling points is of practically no effect.

BRIEF DESCRIPTION OF THE DRAWINGS

One exemplary embodiment of the invention will be explained more in detail hereinafter in connection with the drawings, in which:

FIG. 1 is a schematic view of three cars equipped with the spacing signalling means with which the invention is used.

FIG. 2 is a detail of the interference control means of the invention.

DETAILED DESCRIPTION

The vehicles 1, 2 and 3 which are illustrated in FIG. 1 may, for example, be so-called personnel transport facilities of a short distance travel system, which are intended to travel automatically without stopping from a place of departure to a place of arrival. Such vehicles do not pass one another and hence a single track guide for the vehicles 1, 2 and 3 in connection with a rail or the like will be sufficient.

Aside from externally predetermined speed limits, the vehicles 1, 2 and 3, and further ones not illustrated are intended to regulate themselves, their speed and their distance from each vehicle directly in front of each respectively, in relation to the speed of such last-named vehicle and independently of reference points on the track 4. Such a mode of operation is only possible if each vehicle 1, 2 and 3, and its travel control 5A, 5B and 5C, respectively, is continuously informed as to the distance from a given vehicle to the vehicle immediately ahead. For this purpose the vehicles 1, 2 and 3 are equipped with transmitting and receiving devices 5, 5′, 5″ or 6, 6′, 6″ which are inductively coupled with a line which is stationarily arranged along the track 4 of the vehicles (FIG. 2). In the arrangement of the transmitting and receiving device 5, 5′, 5″ or 6, 6′, 6″ (below the vehicles) as chosen in FIG. 1, the line is on the track 4 and is therefore not here visible.

The transmitting devices 5, 5′ and 5″ may comprise generators for producing a high-frequency alternating current, for example transistor generators, which are each connected to one coil. The receiving devices 6, 6′ and 6″ can each consist of an amplifier (transistor-amplifier) and a coil connected thereto. The coils of the transmitting and receiving devices 5, 5′, 5″ and 6, 6′, 6″ respectively, are of the same construction excepting for the number of their windings.

Further details of the general system to which the present invention is applied are set forth in the above-mentioned U.S. Pat. No. 3,836,770 to which reference is herewith made.

FIG. 2 illustrates schematically a section of a line 47 in connection with the transmitting and receiving means of the vehicle 1, namely a (measuring) transmitting device 5, a compensating transmitting device 17 and a receiving device 6. Between the respective (inductive) couplings 48 (such as through coils with ferromagnetic cores) of the measuring transmitting device and the compensating transmitting device there is provided a further (similar) coupling between the line and a complex impedance 49. Said impedance can be a network of passive or active electric structural elements and its function will be described more in detail below. The measuring transmitting device 5, the compensating transmitting device 17, the receiving device 6 and the complex impedance 49 of FIG. 2 are all associated with the vehicle appearing in FIG. 1, and each of the other vehicles is similarly equipped. The line 47 is a damped line of the above-described type into which the transmitting device 5, if necessary, couples continuously an electric signal in the form of a high-frequency alternating current, which signal is received, for example, for distance determination, by a vehicle which directly follows the (transmitting) vehicle. Such reception is by means of a receiving device which is coupled with the line 47 in the same manner as the transmitter (compare U.S. Pat. No. 3,836,770). In the line 47, the line section from the measuring transmitting device 5 to the complex impedance 49 and the line section from the complex impedance to the compensating transmitting device 17 each represent an electric short line. Contrastingly, the line section from the compensating transmitting device 17 to the receiving device 6, the same as, for example, the line section from the receiving device 6 to the transmitting device of a preceding vehicle represents an electric long line.

The signal of the transmitting device 5 spreads in the line 47 naturally symmetrical in both directions, thus not only in the direction of a following vehicle (backwardly), but also in direction of a preceding vehicle (forwardly) and thus in direction of the receiving device 6. Without additional measures for suppressing the spreading of the signal of the transmitting device 5 forwardly, this signal would thus influence a signal which is transmitted from the transmitting device of a preceding vehicle to the receiving device 6. In order to prevent this, the compensating transmitting device 17 is coupled in each vehicle between the transmitting and receiving device 5 or 6 and between the latter and the transmitting device 5 is coupled the complex impedance 49 with the line 47. Thus the compensating transmitting device 17, if necessary, continuously transmits a signal, whose amplitude corresponds to the signal of measuring transmitting device 5 at the location of the compensating transmitting device and the phase relationship of which is shifted with respect to that of this last-mentioned signal at 180°. Thus the signal of the compensating transmitting device 17 will cancel the signal of the measuring transmitting device 5 appearing at the point of coupling between the line and the compensating transmitting device.

The complex impedance 49 effects a reflection point in the line section between the measuring transmitting device 5 to the compensating device 17 and, with appropriately chosen parameters, causes the signal of the transmitting device 5 which spreads in the direction of the compensating transmitting device (thus forwardly) in the line to be substantially smaller in the amplitude than the signal which spreads from the point of the transmitting device in the line backwardly. Thus the compensating transmitting device 17 must deliver only a signal which is small in the amplitude for cancellation. Furthermore the reflection point which is established by the complex impedance 49 in the line 47 effects a greater phase rotation in the signals which spread in the mentioned line section. The consequence of the aforementioned effects is that the signal which results from the signal of the compensating transmitting device 17 and from the signal of the transmitting device 5 and which (from the location of same) spreads in the line backwardly corresponds according to amplitude and phase relationship substantially to the signal which couples the transmitting device 5 into the line 47.

It may be further noted that the complex impedance 49 may under some circumstances permit the compensating transmitting device 17 to be omitted entirely.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privelege is claimed are defined as follows:

1. In an arrangement for measuring the distance between two successive track-carried objects, each being equipped with transmitters and receivers and transmitting an electrical signal of a defined magnitude, said signal being transmitted by a transmitter of the forward object to a receiver of the next following object, said receiver having a defined sensitivity, said transmitters and receivers being coupled through a damped medium in the form of an electrically conductive line having a defined attenuation characteristic, the improvement comprising complex impedance means mounted on each object coupled with said line to place a passive reflection point for electrical signals on said line, said complex impedance means being coupled with said line between the coupling of said transmitter on each object with said line and the coupling of said receiver on each object with said line.

2. The improved arrangement according to claim 1, wherein for each object between said transmitter and said receiver, a compensating transmitter is coupled with said line, said complex impedance means being coupled to said line between said transmitter and said compensating transmitter.

3. The improved arrangement according to claim 1, wherein said coupling of said complex impedance means with said line is provided near said transmitter.

* * * * *